United States Patent
Raynor

(10) Patent No.: US 7,459,663 B2
(45) Date of Patent: Dec. 2, 2008

(54) IMAGE SENSOR HAVING PARALLEL PIXEL VALUE READOUT

(75) Inventor: Jeffrey Raynor, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 243 days.

(21) Appl. No.: 11/419,029

(22) Filed: May 18, 2006

(65) Prior Publication Data

US 2006/0261249 A1 Nov. 23, 2006

(30) Foreign Application Priority Data

May 19, 2005 (EP) .................................. 05253110

(51) Int. Cl.
*H01L 27/00* (2006.01)
*H04N 3/14* (2006.01)

(52) U.S. Cl. .................................... 250/208.1; 348/302
(58) Field of Classification Search ............. 250/208.1, 250/214 R; 348/241, 246, 308, 302, 303
See application file for complete search history.

(56) References Cited

U.S. PATENT DOCUMENTS

| 6,215,113 B1 | 4/2001 | Chen et al. ................ 250/208.1 |
| 2002/0017666 A1 | 2/2002 | Ishii et al. .................... 257/291 |
| 2002/0190215 A1* | 12/2002 | Tashiro et al. .......... 250/370.11 |
| 2003/0080340 A1* | 5/2003 | Henderson et al. ............. 257/72 |

FOREIGN PATENT DOCUMENTS

WO 99/16238 4/1999

* cited by examiner

*Primary Examiner*—Thanh X Luu
(74) *Attorney, Agent, or Firm*—Lisa K. Jorgenson; Allen, Dyer, Doppelt, Milbrath & Gilchrist

(57) ABSTRACT

The image sensor includes a plurality of pixels, arranged in rows and columns to form a pixel array, each pixel having a pixel output. The image sensor includes at least two column bitlines for each pixel column, each column bitline connected to each pixel output in the pixel column and to a common readout amplifier. In one embodiment, the bitlines are not in the same plane and multiple bitlines are positioned one above the other, maximizing pixel efficiency.

16 Claims, 3 Drawing Sheets

IMAGE SENSOR HAVING PARALLEL PIXEL VALUE READOUT

FIELD OF THE INVENTION

The present invention relates to the field of image sensing, and particularly to an image sensor with bitline redundancy.

BACKGROUND OF THE INVENTION

There is an increasing tendency for larger number of pixels on image sensors used in devices such as digital still cameras, mobile phone cameras and optical computer pointing devices, for example. Consequently, sensors have either increased in size or pixels have been manufactured smaller, or often both. The use of finer geometry technologies increases the chance of defects occurring and reduces yield. Typically, the defectivity of an image sensor is proportional to the area.

Defects are caused during manufacture and are usually caused by dust particles obstructing the photolithography process. Resulting defects may be open circuit or short circuit connections. If a defect occurs within a pixel during manufacture, a defective pixel is usually the result. The defective pixel can be either ignored by the user or, if the defective pixel can be identified, corrected for by interpolating between neighboring pixels.

If the defect occurs on a connection that is common to either a row or column of the pixel array, then a series of pixels in the row or column may be defective, rather than a single pixel. In some Cases, the entire row or column can be defective. Defects that disrupt the operation of more than one pixel are far more noticeable to a user and much harder to compensate for.

Typically, as shown in FIG. 1, a pixel array 100 has a matrix of pixels 110. Each column of pixels 110 in the pixel array 100 is connected by a common column bitline 120. Each row of pixels 110 is connected by a common row select 130. When the row select 130 is activated (set to "high") by row drivers 140, the pixels 110 in that row are enabled for readout and the values of the pixels 110 are read out in parallel on to the column bitlines 120 to readout amplifiers 150.

Redundancy on the row select 130 can be generated by adding additional row drivers 160 on the right of the array as shown in FIG. 2. The row select 130 can then be activated by both the left row drivers 140 and the right row drivers 160, mitigating open circuit defects. As the drivers are relatively small and as the drivers on both sides generate the same signal, there is no need to determine if or where a defect exists, it is merely sufficient to drive the signal.

Short-circuit defects are mitigated during design by increasing the spacing of adjacent metal tracks. The problem is not as simple for the column bitline, as this is the output of the pixel, which must be received or detected. A fault in the bitline will produce an error in all the pixels that are further away from the detection circuit, usually an amplifier, than the defect. Providing additional receivers at the top of the device is impractical as it will significantly increase the area of the sensor and it is also impractical to determine which is the correct signal and which is incorrect.

The traditional method to avoid open circuit bitline connections on large-area sensors, is to use wider traces as these are more immune to defects, however a wider metal conductor prevents light from reaching the sensor and degrades pixel performance. U.S. Pat. No. 6,741,754 Hamilton, "Correcting for defects in a digital image taken by an image sensor caused by pre-existing defects in two pixels in adjacent columns of an image sensor", discloses a method for correcting for defects in a digital image taken by an image sensor when there are pre-existing defects in two pixels in adjacent columns of the image sensor which causes two adjacent lines of pixels in the digital image to have corrupted data.

U.S. Pat. No. 5,436,659, "Method and apparatus for determining defective pixel location", attempts to use digital timing techniques to identify defective pixels and store their locations for correction by an appropriate technique, such as substituting a neighboring pixel value. U.S. Pat. No. 5,291,293, "Electronic imaging device with defect correction", utilizes redundant sensor elements for defect compensation by using a plurality of arrays and pixels in one sensor used to correct info on the other sensor.

SUMMARY OF THE INVENTION

According to the present invention there is provided a image sensor having a plurality of pixels, arranged in rows and columns to form a pixel array, each pixel having a pixel output, the image sensor comprising at least two column bitlines for each pixel column, each column bitline connected to each pixel output in the pixel column and to a common readout amplifier.

Preferably, each column bitline is connected to the other column bitline(s) of the respective column at a plurality of points. Preferably, at least one column bitline of a given column is on a different plane from at least one other column bitline of that column. Preferably, the at least one column bitline is directly above the at least one other column bitline.

According to a second aspect of the present invention there is provided an optical pointing device comprising an image sensor according to the first aspect of the invention. Preferably, the optical pointing device is an optical mouse.

According to a third aspect of the present invention there is provided a mobile device comprising an image sensor according to the first aspect of the invention. Preferably, the mobile device is at least one of a mobile cellular telephone, a camera, a portable computer, a Palm device and a Web Cam.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

As CMOS processing technology advances, not only do the geometries of transistors reduce, but also additional metal layers are added so that transistor interconnection can be performed efficiently.

Figure 1:
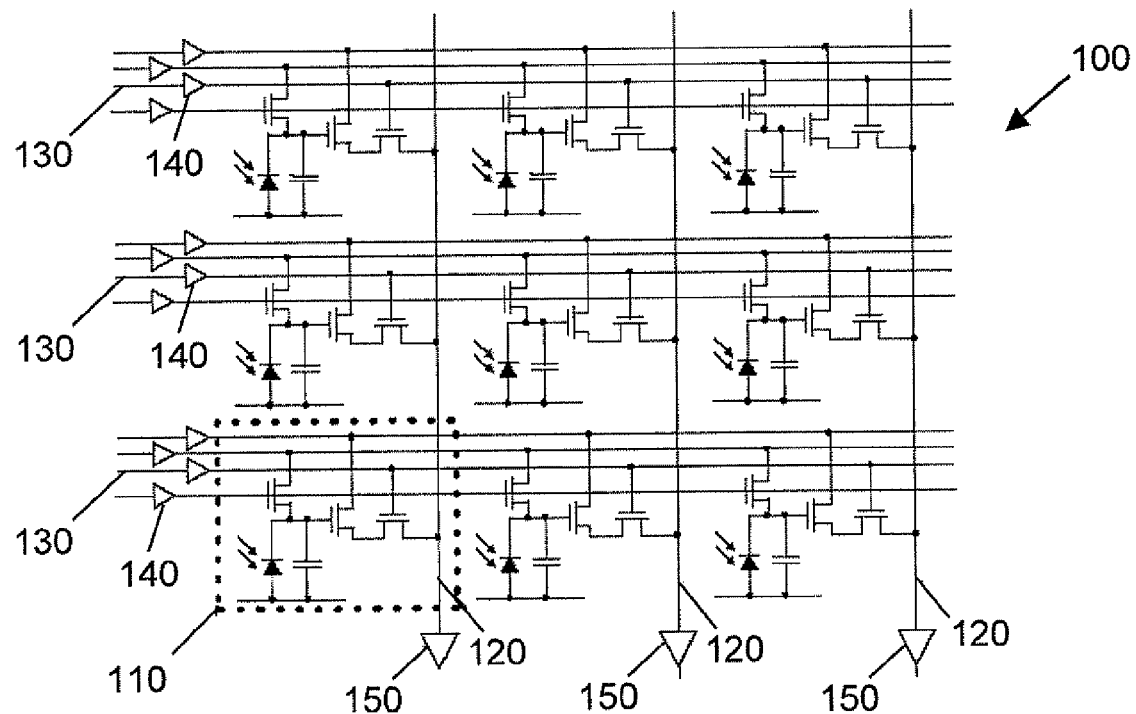
FIG. 1 is a schematic diagram illustrating a prior art image sensor having an array of pixels.
Figure 2:
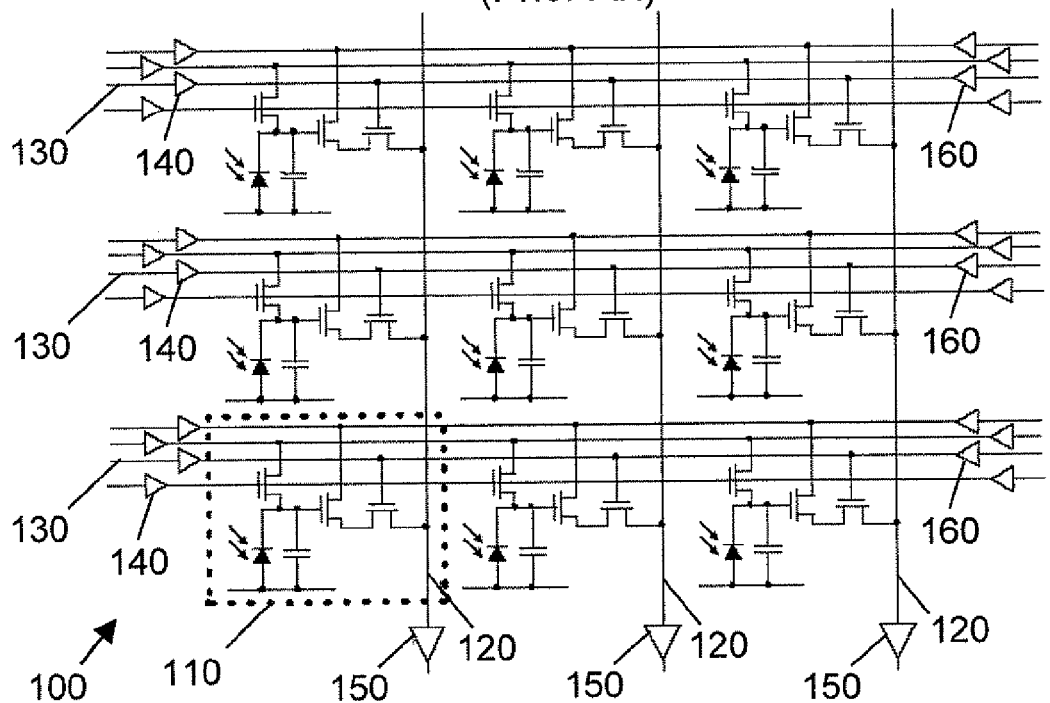
FIG. 2 is a schematic diagram illustrating a prior art image sensor having an array of pixels including additional row buffers for redundancy.
Figure 3:
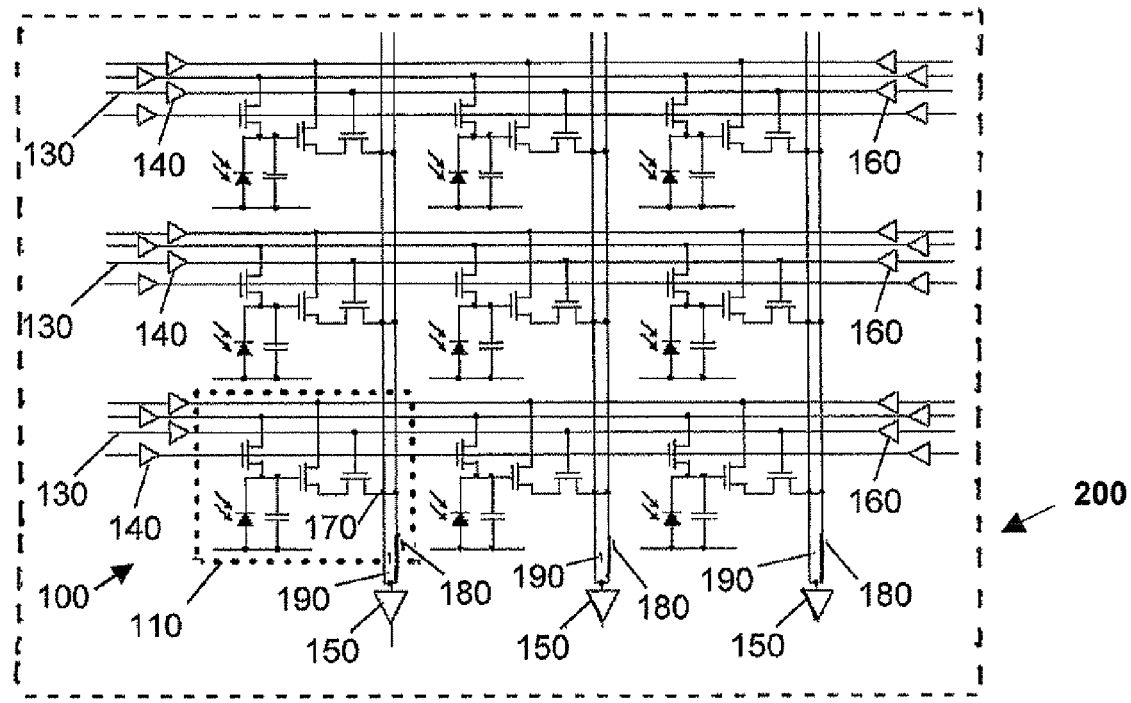
FIG. 3 is a schematic diagram illustrating an image sensor according to the present invention including two bitlines per pixel column.

Referring to FIG. 3, an image sensor array 100 has an array of pixels 110. A pixel output 170 of each pixel 110 is connected to a first column bitline 180 and a second column bitline 190 in the respective column of pixels. Each row of pixels 110 is connected by a common row select 130. When the row select 130 is activated (set to "high") by row drivers 140, the pixels 110 in that row are enabled for readout and the values of the pixels 110 are read out in parallel on to the first and second column bitline 180, 190 to readout amplifiers 150. If a defect occurs on one of the bitlines 180, 190, the pixel output 170 is still electrically connected to the readout amplifier 150 by virtue of the other bitline 180, 190.

Figure 4:
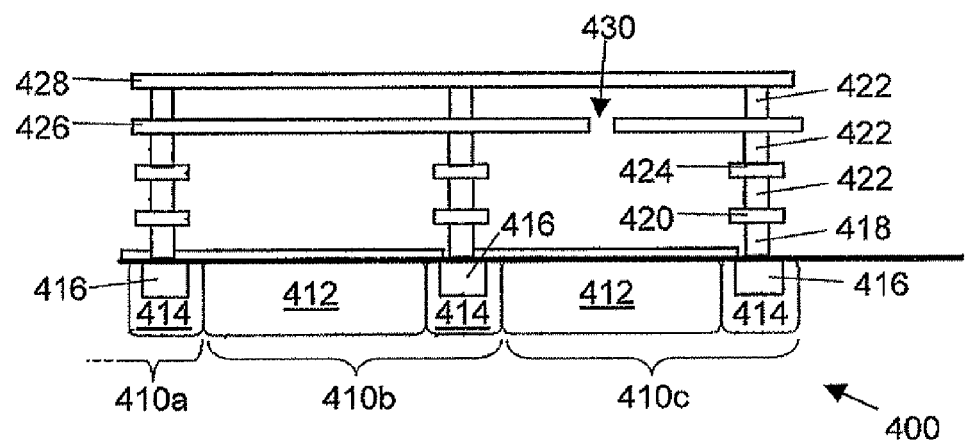
FIG. 4 is a schematic diagram illustrating a side view of two bitlines according to the present invention, including a defect in one of the bitlines.

Referring now to FIG. 4, a side view of a section of an image sensor 400 with at least part of three pixels 410a, 410b, 410c is shown. Each pixel 410 410a, 410b, 410c comprises an N well region 412, a P well region 414 and a N+ region 416. An output contact 418 is connected to the N+ region 416 to provide each pixel 410a, 410b, 410c with an output. Above the output contact 418 a first metal layer 420 enables connections as required to other parts of the image sensor 400 or pixel 410a, 410b, 410c. Connectors 422 are disposed between the first metal layer 420 and a second metal layer 424. The second metal layer 424 provides further connections as required.

In this embodiment, a third metal layer represents a first column bitline 426 and a fourth metal layer represents a second column bitline 428 directly above the first column bitline 426. Connectors 422 enable electrical connectivity between metal layers.

A defect 430, which may have been caused by dust particles during manufacture, is shown in the first column bitline 426. In this example, pixel 410c is at the end of a column of pixels with the bitlines 426, 428 directly connected to a readout amplifier (not shown) after the pixel 410c. Despite the defect 430, pixels 410a and 410b still have electrical connectivity with the readout amplifier by way of the second bitline 428. Defects would have to occur in both the first and second bitlines between successive pixels before connectivity was broken causing full or partial column defectivity.

Furthermore, FIG. 4 indicates a preferred arrangement of the invention, in that multiple bitlines are positioned one above the other. By this arrangement, the addition of one or more bitlines does not impact on the area of the photosensitive substrate and hence the pixel's sensitivity is not affected.

Figure 5:
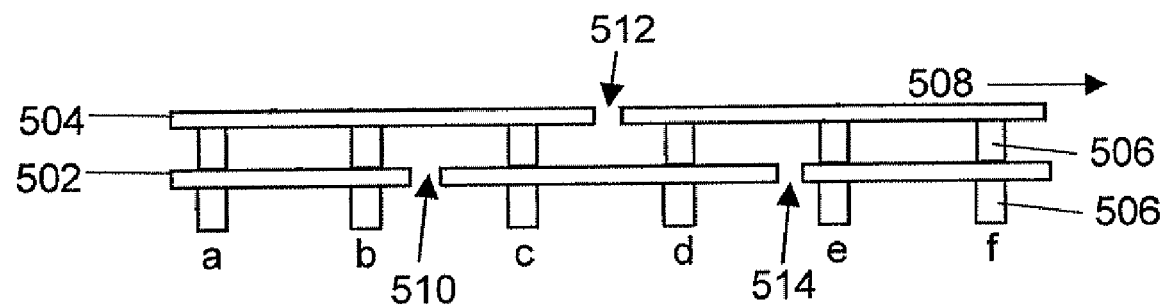
FIG. 5 is a schematic diagram illustrating a side view of two bitlines according to the present invention, including multiple defects in the bitlines.

Referring to FIG. 5, a first bitline 502 and a second bitline 504 are shown connected together at regular intervals by connectors 506. The connectors 506 are typically connected to pixel outputs in a column of pixels. If required, only some of the connectors are connected to pixel outputs with the other connectors simply enabling connections between the first bitline 502 and the second bitline 504. It is advantageous to connect together the first and second bitlines 502, 504 at regular intervals, which adds greater redundancy to the system by mitigating the effects of multiple open-circuit defects. The first and second bitline 502, 504 are connected to a readout amplifier, or other suitable electronic device, at the end indicated by arrow 508.

A first defect 510 prevents electrical connectivity between point's b and c in the first bitline 502. An electrical path is still available between point's b and c via the connectors 506 and the second bitline 504. Furthermore, a second defect 512, between point's c and d on the second bitline 504, and a third defect 514, between point's d and e on the first bitline 502, are also prevented from causing an open circuit in the electrical path to the readout amplifier because of the multiple bitlines 502, 504 and connectors 506.

It should be appreciated that, although only two bitlines have been shown per pixel column in the figures and description, the principle of multiple bitlines per pixel column can be expanded to any number of bitlines. Furthermore, although the bitlines have been described as "column" bitlines, the principal can be equally applied to "row" or other arrangement of pixels requiring a bitline.

The image sensor 100 described above may be provided in an electronic device 200 (FIG. 3) such as an optical pointing device, e.g. an optical mouse. Also, the electronic device 200 may be a mobile device such as a mobile cellular telephone, a camera, a portable computer, a Palm device or a Web Cam, for example.

Improvements and modifications may be incorporated without departing from the scope of the present invention.

That which is claimed is:

1. An image sensor comprising:
   a plurality of pixels arranged in rows and columns to form a pixel array, each pixel having a pixel output to output a pixel value;
   at least two column bitlines for each pixel column, each column bitline connected to each pixel output in the pixel column for parallel readout of the pixel value on the pixel output of each pixel; and
   a common readout amplifier connected to each column bitline.

2. The image sensor as claimed in claim 1, wherein each of the at least two column bitlines for each pixel column is connected together at a plurality of points.

3. The image sensor as claimed in claim 1, wherein at least one column bitline of the at least two column bitlines for each pixel column is on a different plane from at least one other column bitline of the pixel column.

4. The image sensor as claimed in claim 3, wherein the at least one column bitline is directly above the at least one other column bitline.

5. An electronic device including:
   an image sensor comprising
   a plurality of pixels arranged in rows and columns to form a pixel array, each pixel having a pixel output to output a pixel value,
   at least two column bitlines for each pixel column, each column bitline connected to each pixel output in the pixel column for parallel readout of the pixel value on the pixel output of each pixel, and
   a common readout amplifier connected to each column bitline.

6. The electronic device as claimed in claim 5, wherein each of the at least two column bitlines for each pixel column is connected together at a plurality of points.

7. The electronic device as claimed in claim 5, wherein at least one column bitline of the at least two column bitlines for each pixel column is on a different plane from at least one other column bitline of the pixel column.

8. The electronic device as claimed in claim 7, wherein the at least one column bitline is directly above the at least one other column bitline.

9. The electronic device as claimed in claim 5 wherein the electronic device is an optical pointing device.

10. The electronic device as claimed in claim 9, wherein the optical pointing device is an optical mouse.

11. The electronic device as claimed in claim 5 wherein the electronic device is a mobile electronic device.

12. The electronic device as claimed in claim 11 wherein the mobile device is at least one of a mobile cellular telephone, a camera, a portable computer, a Personal Digital Assistant (PDA) device and a Web Cam.

13. A method of making an image sensor comprising:
arranging a plurality of pixels in rows and columns to form a pixel array, each pixel having a pixel output to output a pixel value;
providing at least two column bitlines for each pixel column, including connecting each column bitline to each pixel output in the pixel column for parallel readout of the pixel value on the pixel output of each pixel; and
connecting a common readout amplifier to each column bitline.

14. The method as claimed in claim 13, wherein each of the at least two column bitlines for each pixel column is connected together at a plurality of points.

15. The method as claimed in claim 13, wherein at least one column bitline of the at least two column bitlines for each pixel column is on a different plane from at least one other column bitline of the pixel column.

16. The method as claimed in claim 15, wherein the at least one column bitline is directly above the at least one other column bitline.

* * * * *